3,775,448
GEL-FORMING MONOGLYCERIDES OF CYCLIC CARBOXYLIC ACIDS

Gisela Guhr, Johannes Donatus von Mikusch-Buchberg, Wolfgang Heinrich, and Arnold Bandzauner, Hamburg, Germany, and Yves Tollard d'Audiffret, Neuilly-sur-Seine, France, assignors to Lever Brothers Company, New York, N.Y.

No Drawing. Filed Nov. 1, 1971, Ser. No. 194,495
Claims priority, application Luxembourg, Oct. 30, 1970, 61,972

Int. Cl. C11c 3/00; C07c 69/64; A61k 7/00
U.S. Cl. 260—410.7    5 Claims

ABSTRACT OF THE DISCLOSURE

The invention relates to monoglycerides of cyclic fatty acids having the general formula $$H(CH_2)_y \cdot P \cdot (CH_2)_x \cdot CO \cdot O \cdot C_3H_5(OH)_2$$

where P is a six-membered carbocyclic group and $x$ and $y$ have whole values from 0 to 19 provided that $x+y$ is from 7 to 19. The monoglycerides, on addition to water form firm stable clear gels which are suitable for incorporation into cosmetic and toilet preparations. Typical examples of toilet preparations to which the monoglycerides and gels thereof can impart useful properties are skin cream, sun-screen preparations and deodorant compositions which can be made extremely water-repellant by means of the invention.

---

The present invention relates to glycerol monoesters of cyclic carboxylic acids, to aqueous gels formed from these esters and to compositions containing the gels. The invention also relates to a process for the preparation of the monoesters and gels.

Vehicles which are suitable for both hydrophilic and lipophilic products find application in various technical fields such as the production of cosmetics. Monoglycerides forming sufficiently stable gels with water are very suitable as vehicles of this type.

It is possible to prepare firm aqueous gels from monoglycerides of saturated straight-chain fatty acids containing at least 14 carbon atoms, by heating them to above their melting point, which is generally above 60° C. and adding them to water. According to G. Y Brokaw and W. C. Lyman (Journal of the American Oil Chemists' Society, 35 (1958) 49 ff.), these gels contain about 15–25% by weight of water. However, their stability is suspect, since they are destroyed by advancing crystallisation on being cooled below the melting point of the monoglyceride.

According to U.S. Pat. No. 2,895,879 relatively firm clear gels are also formed when water is added at room temperature to monoglycerides of mixtures of unsaturated fatty acids containing at least 16 carbon atoms, for example oleic, linoleic, and linolenic acids. However such monoglycerides particularly those of linoleic or linolenic acid which are liquid at room temperature, are susceptible to oxidation and therefore have a limited shelf life which considerably restricts their technical applications.

We have now discovered a further class of compounds which on admixture with water form gels having desirable properties.

Accordingly, the present invention provides a gel-forming monoglyceride of a cyclic carboxylic acid of the general formula $$H \cdot (CH_2)_y \cdot P \cdot (CH_2)_x \cdot CO \cdot O \cdot C_3H_5(OH)_2$$

where P is a six-membered carbocyclic group and $x$ and $y$ have whole values from 0 to 19 provided that $x+y$ is from 7 to 19.

By the term "a gel-forming monoglyceride" as used herein is meant one which, on admixture with water, forms a gel.

The present invention also provides a process for preparing a monoglyceride which process comprises esterifying a cyclic carboxylic acid of the general formula $$H \cdot (CH_2)_y P \cdot (CH_2)_x \cdot CO \cdot O \cdot H$$

where P is a six-membered carbocyclic group and $x$ and $y$ have whole values from 0 to 19 provided that $x+y$ is from 7 to 19, with an excess of glycerol.

It is preferred that the value of $x+y$ is 11 so that the straight chain fatty acid from which the cyclic fatty acid used in the preparation of the monoglyceride is derived is a $C_{18}$ acid, for example oleic acid, linoleic acid or linolenic acid or a mixture thereof, for example linseed oil. It is also preferred that the six-membered carbocyclic group in the monoglyceride is saturated although it may also be unsaturated or aromatic.

At room temperature, the monoglycerides of the present invention are tasteless, odourless, colourless to pale yellow surface-active liquids with an oily consistency. Unlike monoglycerides formed from saturated straight-chain fatty acids containing the same number of carbon atoms, they spontaneously form stable gels of a waxy consistency not only on heating over about 60° C., but also at temperatures down to 0° C. as soon as they come into contact with water, whereupon they can take up to 35 wt.-percent of water. Furthermore, they differ from the conventional monoglycerides formed with unsaturated straight-chain fatty acids and their mixtures in that, despite their low melting point, they are resistant to oxidation and form relatively firm gels. The preferred monoglycerides of the present invention, formed from saturated cyclic carboxylic acids, are particularly stable to oxidation and form firm gels. The firmness of the gels formed from the monoglycerides of the invntion was assessed by determining the C values with a Sommer-Runge pentrometer, fitted with a 40° cone, the loading being 80 g. The results of this assessment are shown in Tables 1 and 2.

TABLE 1

| Number | Carboxylic acid of the monoglyceride [1] | Purity of the fatty acid, percent | Clear M.P. or state of monoglyceride at room temperature | C value of penetration for 5 sec., measured at 20° C. on gels containing— | |
|---|---|---|---|---|---|
| | | | | 22% of $H_2O$ [2] | 30% of $H_2O$ [3] |
| 1 | Oleic | 99 | 31.5° C | 725 | 485. |
| 2 | Linoleic [4] | 98 | Liquid | 325 | 280. |
| 3 | Linolenic | 96 | ...do | No gelling | No gelling. |
| 4 | Linseed-oil fatty acids | ca. 100 | Liquid with some solid | 100 | 82. |
| 5 | Aromatic fatty acids (Ex. 3) | 96 | Liquid | 148 | 93. |
| 6 | Unsaturated cyclic carboxylic (Ex. 1) | 93 | ...do | 141 | 89. |
| 7 | Saturated cyclic carboxylic (Ex. 2) | 93 | ...do | 1,020 | 600 (26% of $H_2O$). |

[1] All monoglycerides contained over 90% of $(\alpha+\beta)$-monoglycerides.
[2] Gels prepared as described in Ex. 1a of U.S. Patent No. 2,895,879.
[3] Gels prepared as described in Ex. 2a of U.S. Patent No. 2,895,879.
[4] The gel prepared from this could not be stored at room temperature.

TABLE 2

| Number | Carboxylic acid mixture used to prepare the monoglyceride | $(\alpha+\beta)$-monoglyceride content, percent [1] | Clear M.P. or state of monoglyceride at room temperature | Appearance of gel at room temperature | C value [2] |
|---|---|---|---|---|---|
| 1 | 70% of linoleic; 26% of oleic; 4% of sat. fatty acids | 99 | 27° C | Clear [3] | 560 |
| 2 [5] | 57% of linoleic; 40% of oleic; 3% of sat. fatty acids | 100 | 27° C | do | 600 |
| 3 | Linseed oil fatty acids: 65% of linolenic; 14% of linoleic; 15% of oleic; 6% of sat. fatty acids. | 92 | Liquid with some solid | Turbid | 100 |
| 4 | 93% of sat. cycl. carbox. acids (Ex. 2); 6% of sat. fatty acids | 97 | Liquid | Clear | 1020 |
| 5 | As in No. 4 | [4] 67 | do | Turbid | 150 |

[1] According to Brokaw.
[2] Of penetration for 5 sec., measured at 20° C. on gel containing 22% of $H_2O$.
[3] Turbidity after about two weeks.
[4] As in Ex. 1a in U.S. Patent No. 2,895,879.
[5] Not subjected to molecular distillation.

When allowed to stand in air, the gels prepared from the monoglycerides of the present invention liberate water by evaporation, leaving behind liquid monoglycerides. The replacement of part of the water by glycerol gives gels that keep for an indefinite period. Owing to their very low water-solubility, the gels are stable when kept under water.

The monoglycerides of the present invention are soluble in organic solvents such as methanol, ethanol, isopropanol, benzene, petroleum ether, n-hexane, diethyl ether, ethyl acetate, methylene chloride, carbon tetrachloride, dioxan, dimethylformamide, dimethyl sulphoxide and tetrahydrofuran, and have unlimited miscibility with fatty oils and mineral oils such as olive oil, castor oil, and liquid paraffin. Mixtures formed between such oils and the monoglycerides of the present invention are clear. Furthermore, the monoglycerides of the present invention can be coloured both with oil-soluble and with water-soluble colouring agents.

The monoglycerides of the present invention have relatively low flow points. For example, a flow point of —3° C. is obtained by the method of ASTM-D 97-66 for an approximately 92% mixture of $\alpha$- and $\beta$-monoglycerides which have an $(x+y)$ value of 11 and are prepared from saturated cyclic carboxylic acids in accordance with Example 4. A flow point of —25° C. is obtained for a 95% monoglyceride composition prepared from cyclic unsaturated carboxylic acids in accordance with Example 1, while a flow point of —18° C. is obtained for a 99% monoglyceride composition prepared from aromatic carboxylic acids in accordance with Example 3.

The monoglycerides of the present invention can be prepared by conventional methods for example by esterifying the appropriate cyclic carboxylic acids with excess glycerol, or by transesterifying triglycerides, formed with these carboxylic acids, with excess glycerol. In a preferred embodiment of the invention, the monoglycerides are prepared by esterifying the cyclic carboxylic acids having the above-mentioned structure with a 0.5-5 fold molar excess of glycerol at 200-250° C. while the reactants are intensively mixed, e.g. by stirring. The product is then freed from most of the excess glycerol and further concentrated in monoglycerides by molecular distillation. The distilled product contains at least 90 wt.-percent of the monoglycerides of the present invention.

The cyclic carboxylic acids that are needed as starting materials for the synthesis of the monoglycerides of the present invention with the above-specified structure can be prepared by the conventional methods, e.g. by the cyclisation in an alkaline medium of fatty acids with three or more olefinic double bonds, or of oils containing such fatty acids, e.g. wood oil, linseed oil, and fish oil, possibly followed by their hydrogenation. They can also be prepared by the catalytic aromatisation of esters, formed with mono- or poly-unsaturated fatty acids, and the subsequent concentration of the required cyclic carboxylic acids, possibly followed by their hydrogenation.

In the esterification of cyclic fatty acids with excess glycerol at 200-250° C., the preferred monoglycerides are obtained in a concentration of about 60-70% before molecular distillation. These lower-concentration monoglyceride compositions form, when mixed with water, gels that exhibit relatively low C values of penetration. However, this degree of gelling is sufficient for certain applications, such as a consistency-former for cosmetics, in which case it is unnecessary to subject the monoglycerides to further concentration e.g. by molecular distillation.

In the case of monoglycerides formed with hydrogenated cyclic carboxylic acids, the firmness of the gels, i.e. the C value of penetration increases with the concentration of the monoglycerides.

The monoglycerides of the present invention are also suitable for use as emulsifiers; they can be used in this capacity even at temperatures below 0° C. on account of their low flow points.

Furthermore, they can be used advantageously in cosmetic preparations such as sunscreen oils and creams. Whereas the usual sunscreen preparations get washed off the skin to various extents in water, and therefore must be re-applied after every immersion, the incorporation of monoglycerides of the present invention has the effect that, when the treated skin is wetted, a viscous waxy gel layer is formed hindering the detachment of the protective cream from the skin, thereby making re-application of the cream after bathing superfluous. The substances of the present invention exert a similar effect in hair preparations, since they do not get washed off when a bath or shower is taken.

The monoglycerides of the present invention are also advantageous for use as additives to skin-care agents such as skin-care milk. They not only improve the consistency and the stability of the cosmetic preparation, but also ensure that an oil film remains after application to the skin and after the evaporation of water, this oil film retaining the components which protect and care for the skin. The monoglycerides of the invention may also be added to clear shampoos, water-proof make-up, cleansing cream or milk, deodorant or antiperspirant compositions, hair preparations, shaving creams and dentifrices. Incorporation in shaving creams improves the consistency and the lubricating properties. Their application to razor blades is also advantageous, because, on coming into contact with the aqueous shaving foam, the monoglyceride forms a gel-like layer that enhances the lubricating action, and thus facilitates shaving.

The preparation and use of the monoglycerides of the present invention will be illustrated by the following examples.

EXAMPLE 1

Preparation of cyclic carboxylic acids

Cyclic carboxylic acids were prepared by the alkaline cyclisation of linseed oil in an aqueous medium as described by R. E. Beal, R. A. Eisenhauer, and V. E. Sohns, in J. Am. Oil. Chem. Soc., 42 (1965) 1115. This reaction gave monomeric cyclic carboxylic acids having the following composition and analytical characteristics:

| | |
|---|---|
| Cyclic $C_{18}$ carboxylic acids _____percent__ | 93 |
| Straight chain fatty acids _____do____ | 6 |
| Unsaponifiable matter and other substances do____ | 1 |
| Acid value _____ | 194 |
| Saponification value _____ | 201.5 |
| Iodine value _____ | 123.5 |

EXAMPLE 2

Preparation of saturated cyclic carboxylic acids

Cyclic carboxylic acids prepared as described in Example 1 were hydrogenated in the conventional manner with the aid of a nickel catalyst, giving a product with the following composition and characteristics:

| | |
|---|---|
| Saturated cyclic carboxylic acids _____percent__ | 93.2 |
| Saturated open-chain carboxylic acids ___do____ | 5.8 |
| Aromatic carboxylic acids _____ | (1) |
| Unsaponifiable matter _____percent__ | 0.44 |
| Acid value _____ | 202.3 |
| Saponification value _____ | 202.0 |
| $n_D^{20}$ _____ | 1.4721 |

¹ Not detectable.

EXAMPLE 3

Preparation of aromatic cyclic carboxylic acids

These compounds were prepared as described by D. E. Floyd, R. F. Paschke, D. H. Wheeler and W. S. Baldwin in J. Am. Oil Chem. Soc. 33 (1956) 609. The resulting monomeric cyclic carboxylic acids isolated from the reaction mixture had the following composition and characteristics:

| | |
|---|---|
| Aromatic monocyclic $C_{18}$ carboxylic acids percent__ | 96 |
| Dicyclic $C_{18}$ carboxylic acids _____do____ | 1.5 |
| Non-aromatic cyclic $C_{18}$ carboxylic acids ca. _____do____ | 1 |
| Unsaponifiable matter _____ | 0.9 |
| Acid value _____ | 192.5 |
| Saponification value _____ | 198.5 |
| Iodine value _____ | 6.9 |
| $n_D^{20}$ _____ | 1.5041 |

EXAMPLE 4

Preparation of a monoglyceride from saturated cyclic carboxylic acids 564 g. (2 mole) of the saturated cyclic carboxylic acids prepared in Example 2 and 1060 g. (11.5 mole) of 99.5–99.8% glycerol were heated to 250° C. in about 1 hour, with vigorous stirring and with the introduction of nitrogen, esterification being carried out under these conditions in the course of 8 hours. The mixture was cooled and the two layers were separated by the addition of 1 litre of an aqueous 10% sodium chloride solution and 750 ml. of ethyl acetate. The aqueous glycerol phase was extracted with several 250 ml. portions of ethyl acetate, and the combined ethyl acetate phase was shaken several times with 10% sodium chloride solution. The ethyl acetate was removed from the glyceride mixture by distillation, and the crude glyceride was dried in a rotary vacuum evaporator at 90° C. The yield obtained from two batches consisted of 1359 g. of monoglyceride.

Composition of the crude monoglyceride:

| | |
|---|---|
| ($\alpha+\beta$)-monoglyceride (Brokaw) ___percent__ | 61.6 |
| Free glycerol _____do____ | 0.03 |

The molecular distillation of 1290 g. of this crude product at 173° C. and in a vacuum of $10^{-3}$ mm. Hg gave 798 g. of monoglyceride having the following composition and characteristics:

| | |
|---|---|
| ($\alpha+\beta$)-Monoglyceride (Brokaw) _____percent__ | 95.9 |
| Free glycerol _____do____ | 0.49 |
| Unsaponifiable matter _____do____ | 0.22 |
| Acid value _____ | 0.55 |
| Saponification value _____ | 158.5 |
| Colour (Lovibond 2″) _____ | (1) |

¹ 0.6 yellow, 0 red.

EXAMPLE 5

Preparation of a gel at 0° C.

Two grammes of monoglyceride prepared from saturated cyclic carboxylic acids and subjected to molecular distillation as in Example 4 were placed in a test-tube containing 10 ml. of water, thereby immediately forming a clear firm gel. A clear gel was also obtained immediately when the experiment was repeated with monoglyceride and water cooled to about 0° C.

The following are examples of toilet preparations and cosmetics containing a gel or monoglyceride in accordance with the invention, the monoglyceride being prepared as described in Examples 1 to 4.

EXAMPLE 6

Hand lotion

| | Percent by weight |
|---|---|
| Vaseline oil _____ | 10.5 |
| Monoglyceride of Example 4 _____ | 5.0 |
| Lanolin _____ | 2.0 |
| Cremophor A (an ethoxylated saturated aliphatic alcohol) _____ | 2.0 |
| Trioleyl phosphate _____ | 0.25 |
| Polyoxyethylene sorbitan monolaurate _____ | 0.30 |
| Carbopol 934 (carboxyvinyl polymeric thickener) __ | 0.15 |
| Triethanolamine _____ | 0.19 |
| Tylose MH50 (a methylcellulose thickener) _____ | 1.00 |
| Citric acid _____ | 0.01 |
| Methyl p-hydroxybenzoate _____ | 0.25 |
| Perfume _____ | 0.18 |
| Glycerol (85% aqueous solution) _____ | 5.00 |
| Water _____ | Balance |

NOTE: "Cremophor," "Carbopol" and "Tylose" are registered trademarks.

EXAMPLE 7

Skin cream

| | |
|---|---|
| Monoglyceride of Example 4 _____ | 6.37 |
| Trioleyl phosphate _____ | 3.18 |
| Cremophor O (highly ethoxylated aliphatic alcohol) _____ | 6.63 |
| Paraffin oil _____ | 13.22 |
| Perfume _____ | 0.50 |
| Water _____ | Balance |

EXAMPLE 8

Sunscreen composition

An aerosol sunscreen composition was prepared by combining 1 part of the concentrate described below with 4 parts of a 3:1 mixture of Arctons 11 and 12.

| | Percent by weight |
|---|---|
| Isopropyl myristate _____ | 27.50 |
| Givtan F (an ultra-violet absorber) _____ | 7.50 |
| Monoglyceride of Example 4 _____ | 10.00 |
| Menthol _____ | 0.25 |
| Perfume _____ | 2.50 |
| Ethanol (74 degrees overproof) _____ | 52.25 |

EXAMPLE 9

Deodorant composition

A deodorant composition was prepared by combining 2 parts of the concentrate described below with 3 parts of a 65:35 mixture of Arctons 11 and 12.

| | Percent by weight |
|---|---|
| Monoglycerides of Example 4 _____ | 15.00 |
| Sucrose octa-acetate _____ | 0.14 |
| Perfume _____ | 1.10 |
| Ethanol (74 degrees overproof) _____ | 83.76 |

NOTE.—Arcton is a registered trademark.

The above compositions exhibit good adhesion to the skin and give protective films having a marked degree of water repellancy after contact with either fresh or salt water. In addition the odour of the perfume in the compositions appears to be attenuated by the inclusion of the monoglyceride and it is considered that this may be due to the delayed release of the perfume from the gelled structure of the film.

What is claimed is:

1. As a new substance of matter a monoglyceride of a cyclic carboxylic acid which on addition to water forms a firm, clear, stable gel which monoglyceride has the general formula:

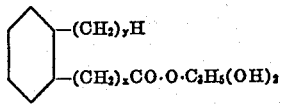

where $x$ and $y$ have whole values from 0–19 provided that $x+y$ is from 7–19, and where the six-member carbocyclic ring is saturated, partially unsaturated or aromatic.

2. A monoglyceride according to claim 1 wherein the carbocyclic ring is saturated.

3. A monoglyceride according to claim 1 wherein $x+y$ is 11.

4. A monoglyceride according to claim 1 being a monoglyceride of a cyclic carboxylic acid derived from oleic acid, linoleic acid, linolenic acid or a mixture thereof.

5. A monoglyceride according to claim 4 wherein the carboxylic acid is formed from linseed oil.

References Cited

UNITED STATES PATENTS

| | | | |
|---|---|---|---|
| 2,868,815 | 1/1959 | Baldwin et al. | 260—413 |
| 3,488,366 | 1/1970 | Dev et al. | 260—398 |
| 3,513,205 | 5/1970 | Bell et al. | 260—617 |

OTHER REFERENCES

Friedrich et al., J. Am. Oil Chemist's Soc. 44, 110–112, February 1967.

LEWIS GOTTS, Primary Examiner

D. G. RIVERS, Assistant Examiner

U.S. Cl. X.R.

252—315, 356; 260—398, 409, 413, 468 R, 476 R; 424—59, 65, 73, 365